…

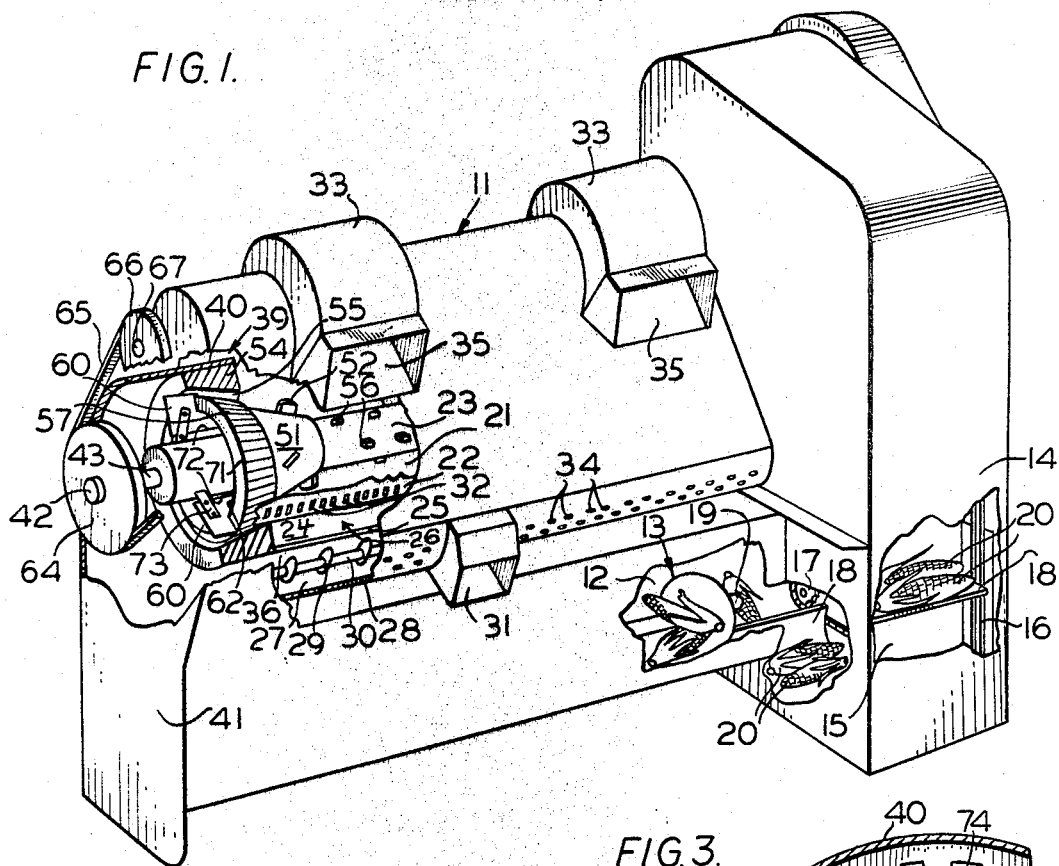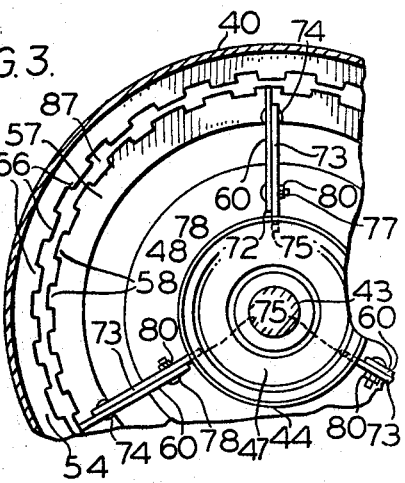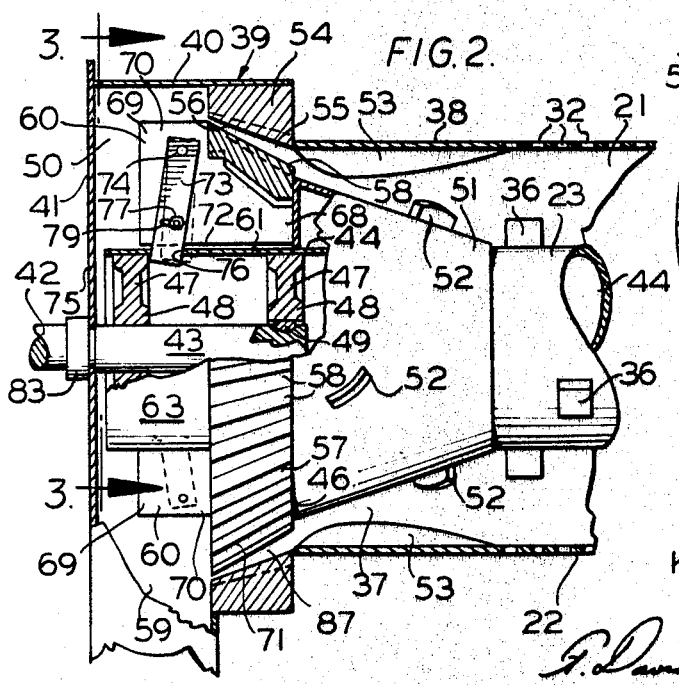

United States Patent Office 3,384,138
Patented May 21, 1968

3,384,138
CORN SHELLER AND COB GRINDER
Kenneth D. Johnson, East Moline, and Elvin L. Carlson, Moline, Ill., assignors to International Harvester Company, Chicago, Ill., a corporation of Delaware
Filed Feb. 7, 1966, Ser. No. 525,616
2 Claims. (Cl. 146—71)

ABSTRACT OF THE DISCLOSURE

A corn processing machine for processing ear corn. The corn processing machine includes a corn shelling section which shells and collects the corn kernels and a cob grinding section which grinds the cobs after they have been separated from the kernels. The output of the corn processing machine is thus separated into a batch of shelled corn and a batch of ground cobs which may then be mixed at a selected ratio.

---

The present invention relates to corn shellers and cob grinders. Particularly, the invention relates to a grinder for cobs and the like adaptable for use in combination with a corn sheller suited as an attachment for a corn picker which is operative incident to and while harvesting.

Circumstances exist under which it is desirable to provide feed comprising mixtures of shelled or cracked corn and ground corn cobs. The general purpose of this invention is to provide a device capable of field operation in combination with a tractor mounted corn harvester that functions to shell the corn, grind the cobs to a selected coarseness and collect the kernels and ground cobs separately. By collecting them separately they can then be mixed at a desired ratio. To attain this a conventional sheller including a concave and cylindrical rotor is utilized. An adjustable inner burr is carried on the downstream end of the cylindrical rotor which cooperates with an annular stationary burr member. The grinding surfaces of the adjustable and stationary burrs are conical and thus by indexing the adjustable burr axially of the cylindrical rotor the coarseness of the ground cobs can be varied. Since the cob burr is located at the downstream end of the cylindrical rotor the cobs entering the burr will be free of kernels and the kernels will have been collected at a station separate from the station for collecting the ground cobs.

Accordingly, it is an object of the present invention to provide an improved cob grinder.

It is a further object of the invention to provide an improved combination corn sheller and cob grinder.

It is also an object of this invention to provide an improved grinder construction.

It is an additional object of the present invention to provide means in a cob grinder for adjusting the fineness of ground cob particles.

Another object of the present invention is the provision of an improved combination corn sheller and cob grinder arranged in operable relationship with each other by reason of which corn is first shelled from cobs by the corn sheller and subsequently, cobs, free of corn, are ground.

It is still a further object of the present invention to provide in a combination device such as last characterized means for collection at separate stations of shelled corn and the ground cobs.

A yet further object of the present invention is the provision of a grinder which can be adapted for comminution of corn cobs during harvesting in conjunction with a corn sheller, the grinder being characterized by a pair of grinding sections which are displaceable relative to each other and having inner and outer co-operable grinding surfaces by reason of adjustment of which variation of the fineness of particulate can be achieved.

Moreover, it is an object of the present invention to provide a cob grinder adapted for use during corn harvesting with a corn sheller and comprising a pair of inner and outer cutting components having cutting members disposed conically and displaceable axially relative to each other whereby spacing of the cutting members may be adjusted to vary the fineness of the particles produced.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a rear perspective view of a combination corn sheller and grinder attachment adapted for a corn picker and embodying the present invention with parts of the housing of the attachment being broken away for the purpose of illustration.

FIG. 2 is an enlarged transverse sectional view through the attachment housing and showing the cob grinder in elevation with parts broken away and parts shown in section for the purpose of illustration.

FIG. 3 is a transverse sectional view of part of the cob grinder taken in a vertical plane substantially along the line 3—3 of FIG. 2 and looking in the direction of the arrows.

Having reference now more particularly to the drawings, in FIG. 1, there is seen a housing 11 of a combination corn sheller and cob grinder which may be in the form of an attachment adapted for mounting on a conventional farm tractor (not shown) and for use with a conventional corn picker (not shown) of the class carried as an attachment on such tractor. The housing 11 is adapted for arrangement in ear receiving alignment with a pair of right and left husking units (not shown) which may form extensions of or comprise a pair of conventional corn picking row units (not shown).

In the lower end portion thereof, the housing 11 defines an auger chamber 12 in which there is mounted a screw conveyor 13. The auger chamber 12 may be adapted for communicative connection through a pair of receiving openings (not shown) with the unseen right and left husking units from which snapped and husked ears of corn 20 are fed for delivery to the right by the screw conveyor 13 into the lower end portion of a vertical elevator housing section 14 which is shown as defining the right hand portion of the attachment housing 11.

A vertical elevator 15 which may comprise an endless link chain means 16 is mounted by suitable means well understood in the art within the elevator housing 14, said link chain means being guided and driven by means including a sprocket 17. The herein illustrated elevator 15 comprises a plurality of transverse flights 18 which are spaced apart from each other longitudinally of said chain means 16. The opposite ends of said flights 18 are secured to the link chain means 16 by which they are carried in a course past the discharge end 19 of the screw conveyor 13 to receive discharged husked ears of corn 20 for translocation upwardly in the elevator housing 14 for deposit at or delivery to the right hand or receiving end portion (not shown) of a horizontal corn shelling chamber 21.

The shelling chamber 21 is defined by a foraminous cylinder or concave 22 having a plurality of grain passing perforations or foramina 32 only some of which have been numbered in the drawings. The concave 22 is of elongated dimension with the axis about which said concave is generated extending longitudinally of the housing 11 in an upper portion thereof in a direction which may be transverse of a harvesting path. Within the concave 22 there is mounted an elongated cylindrical rotor 23 which, in accordance with usual practice, is shown as concentric with said concave in which said rotor 23 is rotatable by means which will become presently apparent.

The concave 22 has disposed thereabout a curved imperforate wall or guide plate structure 24 which extends longitudinally of said concave. Guide plate 24 has an elongated opening 25 in the base thereof which communicatively connects a chamber 26 formed between concave 22 and said guide plate 24 with an auger trough 27 which is disposed below chamber 26 and defined by an elongated auger housing 28. Thereby, shelled corn which passes through the foramina 32 will be guided to the trough 27.

A screw conveyor 29 which comprises an elongated shaft 30, opposite end portions of which are suitably journalled to mount the conveyor 29 within the trough 27, is defined by a pair of oppositely turned conveyor threads carried on opposite end portions of said shaft, only one of said conveyor threads being shown to the left of FIG. 1. Thereby, shelled corn deposited in the trough 27 will be conveyed centrally from opposite sides of the auger housing 28 toward a centrally disposed common discharge duct 31 which is communicatively connected with the trough 27 and provides a delivery port for removal of shelled corn from housing 11.

As illustrated in FIG. 1, a lower end portion of the auger housing 28 is fashioned to provide a plurality of small air intake ports or openings 34 which are disposed longitudinally of said housing 28, and only some of which have been numbered in FIG. 1. To preclude leakage of grain through ports 34, the dimensions of such ports are less than corresponding dimensions of the shelled corn. As also illustrated in FIG. 1, a pair of upwardly offset housing sections 33, 33, which are spaced apart longitudinally of the housing 11 and fashioned integral with an upper portion thereof, provide casings or enclosures for a pair of winnowing fans (not shown). The unseen fans are adapted to draw air upwardly through the ports 34 for discharge through a pair of exhaust openings 35, 35 in the housing sections 33, 33 respectively. Air drawn through the ports 34 will lift or float blowable debris from shelled corn in the auger trough 27 for discharge through the exhaust openings 35, 35.

A plurality of corn shelling projections 36 which may be of conventional square cut and only some of which have been numbered in the drawings, are rigidly secured in aligned disposition along spiral paths on the surface or periphery of the rotor 23. The projections 36 are adapted to function in a conventional manner, that is, to cause abrasion of ears of corn against the inner surface of the concave 22 to liberate kernels from their cobs and simultaneously to drive non-grain vegetation longitudinally of the rotor 23 toward the discharge end portion 37 of shelling chamber 21, that is, to the left with respect to FIG. 1. In a conventional manner, ears of corn 20 which are deposited in the right end or receiving opening of the shelling chamber 21 will have their kernels gradually shelled the grain passing through foramina 32 and into auger trough 27. The construction is such that when the ears have reached the chamber end portion 37 they will be substantially denuded cobs. Additionally, other vegetation such as husk material which may have entered the shelling chamber 21 at the time of delivery thereto of husked ears 20 will also be delivered with the cobs to the chamber end portion 37, inasmuch as the physical character of husk material is such that it does not lend itself to comminution or reduction in size adequate to allow passage through the foramina 32.

As illustrated in FIG. 2, the concave 22 has a discharge end section 38 which defines chamber end portion 37 and which is non-porous or non-foraminous. The concave section 38 culminates at the entryway 55 of a cob mill or cob grinder generally designated as 39. The cob grinder is defined by a curved metal casing 40 which in the illustrated embodiment is integral with and comprises a section of housing 11. The cob grinder casing 40 is shown in FIG. 2 as being disposed to the left of concave section 38 and having therein a chamber 50. A flat sheet metal plate or wall 41 which forms the left side of the housing 11, as illustrated in FIG. 2, defines the outer wall of casing 40.

One end portion 42 of a drivable rotor shaft 43 is projected outwardly from the housing 11 through an aperture in the side wall 41 about which an anti-friction bearing member 83, which may be of conventional construction, is secured for journalling of said shaft. The shaft 43 is constrained for rotation with the rotor 23 and accordingly is adapted to motivate said rotor. To the end that the rotor and shaft are operably arranged, the rotor shown in the accompanying drawings comprises an outer shell-like portion 44 which is concentric with the shaft 43 and has a plurality of internal centrally apertured discs 47. The discs may be fashioned integrally with said rotor and are spaced apart from each other longitudinally or axially of the shaft 43. The discs 47 are centrally enlarged about their central apertures to form hub sections 48 which define an axial passage in the rotor 23 through which the rotor shaft 43 extends. As illustrated in FIG. 2, the hub sections 48 may have therewith fashioned splines 49, one of which is shown in FIG. 2, which engage in key-ways or slots provided therefor in the shaft 43 to thereby lock said shaft and rotor together.

To drive shaft 43, a sheave 64 is mounted on the end portion 42 of said shaft in any suitable manner which will constrain said sheave for rotation with the shaft. The sheave is operably engaged by a pulley belt 65 which may serve to transmit prime mover torque. The belt 65 also operably engages in the groove of a sheave 66 which is constrained for rotation with a shaft 67 for driving the unseen fan impellers which are disposed in the housing sections 33, 33. As illustrated, the rotor 23 has a section 61 a portion of which extends outwardly from shelling chamber 21 into the cob grinding chamber 50, the rotor section 61 terminating adjacent the side wall 41. A truncated feed cone 51 the form of which is generated on an axis defining the axis of rotation of the rotor 23 is slidably mounted about the inner portion of the rotor section 61 which is disposed within the shelling chamber end portion 37. The feed cone carries a plurality of external feeding paddles 52 which are slightly arcuate and longitudinally disposed relative to the axis of rotation of said rotor 23. Said paddles together with a plurality of flights, vanes or feeding ribs 53, which project inwardly from the concave section 38 to which said feeding ribs are secured, serve to feed corn cobs and other vegetation toward the cob grinding chamber 50.

A relatively stationary outer burr member 54 outwardly defines the entryway inlet opening 55 to the cob grinder chamber 50 into which cobs are fed from the rotor chamber end portion 37. Said stationary outer burr member comprises a plurality of grinding adjacent burrs or teeth 56 which extend longitudinally of and are disposed concentric with the rotor 23 in a conical section from which section said burrs 56 project inwardly being fashioned as elongated cutting or abrading members. The outer burr member 54 may be supported by the casing 40, as illustrated in FIGS. 1 and 2.

The cob mill or cob grinder 39 comprises a rotatable inner burr member 57 which inwardly defines inlet opening or entryway 55. Burr member 57 comprises a plurality of adjacent grinding burrs or teeth 58, only some of which have been numbered in the drawings, and which extend axially of and are disposed concentrically with the rotor 23 in a conical section from which said burrs 58 project outwardly. The inner burr member 57 is rigidly secured by any suitable means, such as welding or the like as illustrated at 46, to the downstream end portion of the feed cone 51; and said inner burr member 57 is disposed within the opening defined by the outer burr member 54 though spaced therefrom thereby forming cob mill entryway 55.

During normal operation of the foregoing construction, cobs and other vegetation will be forced through the inlet opening or entryway 55 and moved to the left with respect to FIG. 3 by the flow of oncoming material from the chamber end portion 37, being assisted by the axial extension of the burrs or grinding teeth 56 and 58 in their respective conical sections. As the cobs pass downstream between burr members 54 and 57, they will be successively comminuted in the gradually narrowing space 87 between said burr members 54 and 57 as they coact.

At the downstream end of the burr members, the grinding chamber 50 has an outlet portion 59 adapted for discharge of ground cobs or cob particulate and other material which falls from the downstream end of the space 87. In this regard, it is observed that the normal operative spacing of the burrs 56 and 58 and the physical characteristics of husk material are such that husks, if any, which enter the cob mill 39 will not be ground, but will be discharged therefrom through the cob outlet portion 59 substantially intact.

To the end that corn cob particulate may be ground to varying fineness, adjustable cob grinding means embodying the instant invention are provided. Such adjustable cob grinding means comprises a plurality of connectors, bosses, plates or vanes or the like 60 which in the instant embodiment extend axially of and are projected radially outwardly from the rotor end section 61. As illustrated, said rotor end section 61 extends through the feed cone 51 and has a downstream end portion 63 which is projected outwardly from the flared end opening 62 of said inner burr member 57.

While it is not intended that the specific design of the connectors, bosses, plates or vanes 60 which are shown in the drawings limit the present invention, in order to best describe the invention, it is noted that said connectors 60 are connected to the feed cone 51 and the inner burr member 57 in a manner such that they are constrained for adjusting movement together axially of the rotor 23. The construction of the connectors 60 shown in the drawings discloses an inner or upstream portion 68 of each thereof disposed within the burr member 57 and secured against the end of feed cone 51; while an outer or downstream portion 69 of each connector 60 is disposed outwardly from said burr member 57 with an overlapping flange portion 70 of each of said connectors secured against the outer end face 71 of the burr member 57. Moreover, it is observed that each of the connectors 60 is connected to the feed cone 51 and rotatable burr member 57 in a manner such that the straight inner edge 72 of each connector 60 may be slightly spaced from rotor section 63 whereby central movement of the connectors can be accommodated during axial adjustment in a manner presently to become apparent.

By connecting the inner burr member 57 to the feed cone 51 in a manner such that the outer surfaces of those elements are coextensive and are constrained for movement or adjustment together with one another axially of the rotor 23, uninterrupted feeding of cobs from the shelling chamber 21 into the cob mill or cob grinding chamber 50 is insured. That is to say, because the feed cone 51 moves together with the inner burr member 57 axially of the rotor 23 there is no likelihood of cobs being trapped or the progress of normal processing movements being disturbed when the parts are adjusted axially in a manner and by means to be next described.

For axially adjusting the inner burr member 57 and the feed cone 51, adjusting means comprising a plurality of locating and driving lugs or rockable arms 73 are employed, one of said arms being pivotally connected to each of the outer parts 69 of the connectors 60 at an eccentric or outer portion thereof as at 74. The inner end portion 75 of each of said arms or locating and driving lugs 73 is projected into a slot or opening 76 in the rotor end portion 63. The dimensions of each of the slots 76 axially of the rotor 23 is slightly larger than the corresponding dimension of its arm end portion 75 to permit each arm 73 to be moved or rocked within the limits of its correspondning slot 76 which slot limits may be employed as fulcrums for adjusting said connectors.

The character of the construction is such that the connectors 60 and accordingly the inner burr member 57 and the connected thereto feed cone 51 may be axially moved or adjusted relative to the arms 73 about the pivots 74, or constrained for axial adjustment with the arms 73 within the limits of the slot 76. Constraint during latter adjustment is achieved by means of a fastener generally designated 77 which is associated with each of the arms 73 and its adjacent connector 60.

As illustrated in FIG. 3, each fastener 77 may comprise a screw 78 which extends through its associated connector 60 and is projected through a slot 79 in a corresponding arm 73 with a nut 80 threadably mounted on the screw 78 to releaseably impinge each arm 73 against its respective connector 60.

The former movement, namely the relative adjustment of the inner burr member 57 with respect to the arms 73 can be achieved only upon release of the nuts 80 whereby the connectors 60 may be axially adjusted within the limits of the slots 79 relative to the arms 73. While the nuts 80 secure connectors 60 to arms 73 relative adjustment of connector 60 and arms 73 cannot be achieved.

By reason of the foregoing construction, the dimension of the space 87 between the burrs 56 and 58 is adjustable by relative axial movement thereof. Thereby, the particulate sizes or dimensions can be selectively adjusted. By providing grinding members which comprise elongated burrs which extend axially on opposed conical surfaces, undesirable shredding of husks which may be included with the cobs is precluded whereby the same can be readily separated from the particulate by suitable means (not shown) which will be apparent to those skilled in the art.

While the grinder or mill herein illustrated is adapted for preparation of cob particulate during harvesting or in conjunction with a corn shelling operation, it is appreciated that the grinder or mill may be otherwise employed. Accordingly, insofar as the invention in a grinder or mill is concerned, its description for use in feed preparation is intended as illustrative and not limiting. As many substitutions or changes could be made in the above described construction, and as many apparently widely different embodiments of the invention within the scope of the claim could be constructed without departing from the scope and spirit thereof, it is intended that all matter contained in the accompanying specification shall be interpreted as being illustrative and not in a limiting sense.

What is claimed is:

1. A corn processor of the type including a foraminous corn sheller housing and a sheller rotor in grain abrading relationship with said housing and adapted to receive ears of corn, shell the kernels from the corn, pass the shelled kernels through the foraminous housing and deliver the denuded cobs to a cob outlet, the improvement comprising: a cob mill comprising relatively rotatable inner and outer cob grinder members, said inner grinder member arranged to rotate with said sheller rotor and having a conical grinding surface, said outer grinder member being fixed relative to said foraminous corn sheller housing and having a conical grinding surface spaced from the grinding surface of said inner grinder member, said inner grinder member including means for adjusting it axially of said sheller rotor to thus vary the spacing between said inner and outer cob grinder members.

2. The invention as set forth in claim 1 wherein said means for adjusting the inner grinder member axially of said sheller rotor includes a plurality of arms pivotally mounted along the outer peripheral portion of said inner grinder member such that the free ends of said arms extend axially inwardly, means for locking said arms in a selected position relative to said inner grinder member, and slots formed in said sheller rotor for receiving the free ends of said arms.

References Cited
UNITED STATES PATENTS

| | | | |
|---|---|---|---|
| 612,940 | 10/1898 | Woodcock | 241—247 |
| 2,298,830 | 10/1942 | McGillis | 130—6 |
| 2,653,770 | 9/1953 | Vicci | 241—245 X |
| 2,970,780 | 2/1961 | Bowen | 241—101 |
| 3,348,780 | 10/1967 | Barkstrom et al. | 146—74 X |

W. GRAYDON ABERCROMIE, *Primary Examiner.*